(12) United States Patent
Wilkerson et al.

(10) Patent No.: US 8,103,830 B2
(45) Date of Patent: Jan. 24, 2012

(54) DISABLING CACHE PORTIONS DURING LOW VOLTAGE OPERATIONS

(75) Inventors: Christopher Wilkerson, Portland, OR (US); Muhammad M. Khellah, Tigard, OR (US); Vivek De, Beaverton, OR (US); Ming Zhang, Portland, OR (US); Jaume Abella, Barcelona (ES); Javier Carretero Casado, Barcelona (ES); Pedro Chaparro Monferrer, Barcelona (ES); Xavier Vera, Barcelona (ES); Antonio Gonzalez, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 633 days.

(21) Appl. No.: 12/242,321

(22) Filed: Sep. 30, 2008

(65) Prior Publication Data

US 2010/0082905 A1  Apr. 1, 2010

(51) Int. Cl.
*G06F 12/16* (2006.01)

(52) U.S. Cl. ........ 711/118; 711/135; 711/145; 711/163; 711/165

(58) Field of Classification Search .................. 711/118, 711/135, 145, 163, 165
See application file for complete search history.

(56) References Cited

U.S. PATENT DOCUMENTS

| | | | |
|---|---|---|---|
| 5,371,709 A | 12/1994 | Fisher et al. | |
| 7,904,658 B2 * | 3/2011 | Abadeer et al. | 711/128 |
| 2002/0103977 A1 | 8/2002 | Ewoldt | |
| 2002/0129201 A1 | 9/2002 | Maiyuran et al. | |
| 2005/0097277 A1 | 5/2005 | Maiyuran et al. | |
| 2006/0268592 A1 | 11/2006 | Mohammad et al. | |
| 2008/0010566 A1 | 1/2008 | Chang et al. | |
| 2008/0276236 A1 | 11/2008 | Branover et al. | |
| 2009/0172283 A1 * | 7/2009 | Khellah et al. | 711/118 |
| 2010/0191990 A1 * | 7/2010 | Zhang et al. | 713/320 |
| 2010/0228922 A1 * | 9/2010 | Limaye | 711/135 |

OTHER PUBLICATIONS

International Preliminary Report on Patentability for PCT/US2009/058026, mailed on Apr. 14, 2011, 1 page.
International Search Report for PCT Application No. PCT/US2009/058026, mailed on May 10, 2010, 2 pages.
Written Opinion of the International Searching Authority for PCT Application No. PCT/US2009/058026, mailed on May 10, 2010, 3 pages.
Roberts, et al., "On-Chip Cache Device Scaling Limits and Effective Fault Repair Techniques in Future Nanoscale Technology," Digital System Design Architectures, Methods and Tools, Aug. 29-31, 2007, pp. 570-578.
Wilkerson, et al., "Trading Off Cache Capacity for Reliability to Enable Low Voltage Operation," 35th Annual International Symposium on Computer Architecture (ISCA-2008), Beijing, China, Jun. 25, 2008, 12 pages.

* cited by examiner

*Primary Examiner* — John Lane
(74) *Attorney, Agent, or Firm* — Mnemoglyphics, LLC; Lawrence M. Mennemeier

(57) ABSTRACT

Methods and apparatus relating to disabling one or more cache portions during low voltage operations are described. In some embodiments, one or more extra bits may be used for a portion of a cache that indicate whether the portion of the cache is capable at operating at or below Vccmin levels. Other embodiments are also described and claimed.

20 Claims, 6 Drawing Sheets

DISABLING CACHE PORTIONS DURING LOW VOLTAGE OPERATIONS

FIELD

The present disclosure generally relates to the field of electronics. More particularly, an embodiment of the invention relates to disabling one or more cache portions during low voltage operations.

BACKGROUND

Today's mass produced silicon may suffer from a number of manufacturing induced parameter variations. These variations may cause issues in the manufacture of various types of memory cells. The variations are responsible for a phenomenon known as Vccmin which determines the minimum voltage at which these memory cells may operate reliably. Since the typical microprocessor contains a number of structures implemented using various types of memory cells, these structures typically determine the minimum voltage at which the microprocessor as a whole may reliably operate. Since voltage scaling may be effectively used to reduce the power consumed by a microprocessor, Vccmin may become an obstacle to utilizing a particular design at lower voltages.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
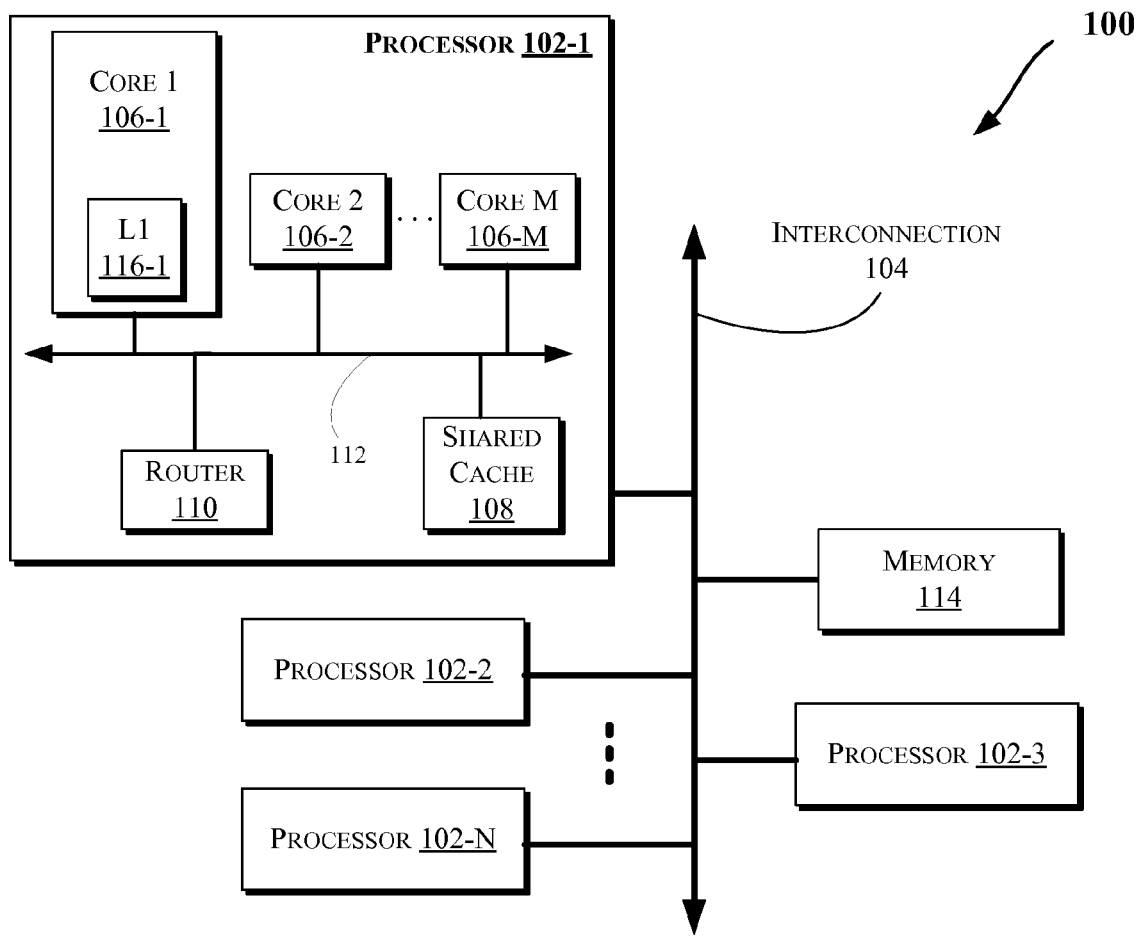
FIGS. 1, 6, and 7 illustrate block diagrams of embodiments of computing systems, which may be utilized to implement various embodiments discussed herein.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof. Also, even though some embodiments discussed herein may refer to a set or clear value as logical 0 and 1, respectively, these terms are interchangeable, e.g., depending on the implementation.

Some embodiments provide for disabling one or more cache portions (such as a cache line or a subblock of a cache line) during low voltage operations. Overcoming the Vccmin obstacle (discussed above) may allow memory devices to operate at or below Vccmin levels, which reduce power consumption, e.g., resulting in increase of battery life in mobile computing devices. Also, in some embodiments, performance loss may be mitigated by retaining operation of memory cells in a cache at lower granularity than cache line during low voltage operations. Furthermore, one embodiment of the invention maintains memory cell voltage at a voltage level, such that the cell will reliably retain stored information for a period of time, e.g., under conditions warranted under Intel® documented reliability standards. Generally, memory cells are considered to operate reliably at a given voltage level when they pass a battery of tests at such voltage level. Such tests may evaluate read, write, and retention capabilities of memory cells. For example, only those cells observing no errors during tests are considered reliable.

In an embodiment, one or more cache lines may be disabled during operation at an Ultra Low Operating Voltage (ULOV), e.g., based on a determination (such as indicated by a bit value corresponding to the one or more cache lines) that the one or more cache lines are not functional (or not reliably operable) at ULOV. ULOV may be a lower level, e.g., by about 150 mV, than some other current low voltage levels of about 750 mV (which may be referred to herein as "minimum voltage level"). In one embodiment, a processor may transition to an Ultra Low Power Mode (ULPM) (e.g., operating at ULOV) in response to a determination that one or more cache lines incapable of operating at ULOV have been flushed (e.g., invalidated and/or written back to other memory devices such as a main memory if necessary).

In one embodiment, performance loss due to decreased cache size (as a result of disabling cache lines) may be mitigated, e.g., in high-performance out-of-order processors. For example, moderate faulty bit rates may be tolerated with relatively low cost in performance, low complexity, and high performance predictability. Such solutions are considered effective during or below Vccmin operational levels while keeping performance unaffected during high Vcc operation. In an embodiment, for Vccmin or below operations, faulty subblocks at fine granularity (e.g., 64 bits) may be disabled in such a way that cache lines with one or few faulty subblocks may still be used, and thus reduce the performance overhead incurred by cache line disabling schemes. Moreover, high performance predictability, which is key for binning chips, is achieved by rotating address mapping into cache lines in such a way that programs whose performance depends on few cache sets will potentially receive a performance hit in a similar manner independently of the location of the faulty subblocks in cache. Such techniques are believed to have little or no performance loss impact when operating at high Vcc.

Techniques described herein may allow for improved performance in various computing devices, such as those discussed for example with reference to FIGS. 1-7. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection network or bus 104. Each processor may include various components, some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106" or more generally as "core 106"), a shared cache 108, and/or a router 110. The processor cores 106 may be implemented on a single integrated circuit (IC) chip. Moreover, the chip may include one or more shared and/or private caches (such as cache 108), buses or interconnections (such as a bus or interconnection network 112), memory controllers (such as those discussed with reference to FIGS. 6 and 7), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The shared cache 108 may store data (e.g., including instructions) that are utilized by one or more components of the processor 102-1, such as the cores 106. For example, the shared cache 108 may locally cache data stored in a memory 114 for faster access by components of the processor 102. In an embodiment, the cache 108 may include a mid-level cache (such as a level 2 (L2), a level 3 (L3), a level 4 (L4), or other levels of cache), a last level cache (LLC), and/or combinations thereof. Moreover, various components of the processor 102-1 may communicate with the shared cache 108 directly, through a bus (e.g., the bus 112), and/or a memory controller or hub. As shown in FIG. 1, in some embodiments, one or more of the cores 106 may include a level 1 (L1) cache (116-1) (generally referred to herein as "L1 cache 116") and/or an L2 cache (not shown).

Figure 2A:
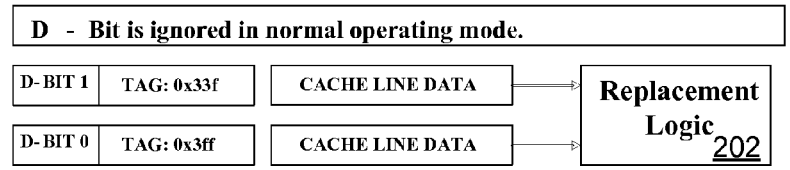
FIGS. 2A and 2B illustrate embodiments of caches in accordance with some embodiments.
Figure 2B:
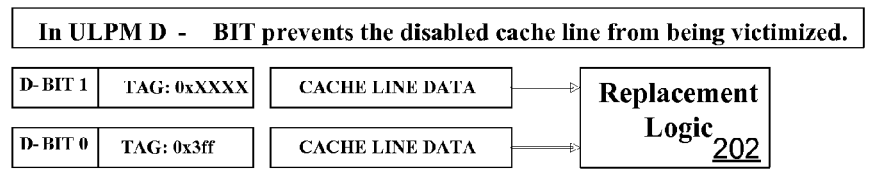

FIGS. 2A and 2B illustrate embodiments of caches in accordance with some embodiments. In some embodiments, the caches shown in FIGS. 2A and 2B may be used as caches discussed with reference to other figures herein such as FIGS. 1, 6, or 7. More particularly, in some embodiments, configurable caches may be utilized in computing device. Such configurable caches may tradeoff capacity for low voltage operation.

In some embodiments, one or more of the following three parts may be used. First, an additional low power state is introduced (referred to herein as ULPM), which uses a voltage level referred to as ULOV. In one embodiment, ULOV is at about 150 mv less than a current value of Vccmin (which we will assume is about 750 mv). Second, a voltage sorting algorithm may be used to determine which cache lines are functional at ULOV. Third, each group of cache lines is associated with a disable bit or d-bit. The voltage sorting algorithm will set the d-bit for each group of cache lines that is not fully functional at the ultra low operating voltage.

Furthermore, ULPM may be considered an extension to the existing Power States. For example, when a microprocessor transitions to ultra low power mode all cache lines for which the d-bit has been set will be flushed from the caches that will be affected by the transition to the lower voltage. If we assume that the LLC, the DCU (L1 data cache), and the IFU (L1 instruction cache), will be operating at ULOV after the transition, then all cache lines in the DCU and ICU for which the d-bit has been set will be flushed (invalidated and written back to memory 114, for example, if necessary). Next the LLC will be prepared for ULOV operation by flushing each cache line for which the d-bit has been set. Once all cache lines for which the d-bit has been set have been purged from the system, a corresponding processor may transition to ULPM.

Generally, a cache is organized into sets, each of which consists of a number of ways. Each way corresponds to a single cache line which is typically 32-64 Bytes. A cache lookup occurs when a processor presents an address to the cache. The address may be decomposed into three components: a line offset, a set select, and tag. Consider a cache design with 1024 sets, each consisting of 8 ways, each way consisting of a single 64 byte line. The entire cache will consist of 512 KB of storage (1024*8*64). If the cache is designed to handle 50 bit addresses, then the cache may be indexed as follows. Bits 0-5 will be the line offset specifying the byte in the 64 byte line. In some embodiments, bits 0-5 may specify the starting byte, in part, because multiple bytes may be accessed depending on the load/store instruction. For instance, a single byte (or two bytes, etc.) may be read starting from the indicated byte, etc. Bits 6-15 will be the set select specifying the set that will store the line. The remainder of the bits (16-49) will be stored as a tag. All cache lines for which the set select bits are equal will compete for one of the 8 ways in the specified set.

In an embodiment, a group of cache lines may be associated with a d-bit which specifies whether or not the group of cache lines is functional at lower voltages. As shown in FIGS. 2A and 2B, the d-bit has no effect unless the processor is either in ULPM or transitioning to ULPM as determined by a replacement logic 202. Accordingly, the logic 202 may detect access to one or more cache portions (such as cache lines) and determine whether the cache portions are operable at or below Vccmin. In the transition to ULPM, all cache lines for which the d-bit is set are flushed. This is to prevent a loss of data after the transition to ULPM. During ULPM, the cache functions as it normally would with the exception that only cache lines associated with a d-bit set to 0 are considered valid. When a set is searched for an address in ULPM the d-bit prevents erroneous matches with disabled lines. Even though embodiments discussed herein may refer to a set or clear value as 0 and 1, respectively, these terms are interchangeable depending on the implementation. For example, a clear d-bit may indicate disabling of one or more corresponding cache lines.

Moreover, when a cache miss occurs the replacement logic 202 selects a cache line to evict from the cache. The cache line is then overwritten with new data fetched from memory. In ULPM, the d-bit is considered by the replacement logic 202 (FIG. 2B) to prevent allocations to disabled cache lines. This may be achieved by forcing the replacement process to treat the disabled lines as MRU (Most Recently Used). This age-based vector replacement process, for example, may be applicable for disabling individual cache lines. In this process, a bit vector (1-bit per cache line) is scanned and first line marked with a 0 is identified as LRU (Least Recently Used) and replaced. By forcing the bit associated with a cache line to 1 the line is always treated as MRU and not chosen for replacement.

As for defects in d-bits, in ULPM where the d-bits affect the function of the cache, an d-bit defect may manifest itself in one of two ways. A d-bit value of 0 indicates a cache line that is functional at low voltages. Conversely, a d-bit value of 1 indicates a cache line that is non functional at low voltages. The first scenario is where a d-bit is stuck at 1 disabling the cache line. In this scenario a cache line with all bits functional but a broken d-bit will be disabled. This ensures correct function in this scenario. The second scenario is where the d-bit is stuck at 0. This is a problem if the line is defective since the broken d-bit will incorrectly indicate a functional cache line. To ensure correct function an embodiment ensures that none of the d-bits may be erroneously stuck at 0. One way to address this is to change the cell design to make a d-bit broken in this way unlikely. A second approach would be to add one or more redundant d-bits. For example one might use three d-bits. All three bits would then be written the same way (all 1s, or all 0s). If the d-bits are read and any one of the bits is set to 1, it may be treated as a disabled cache line. Only d-bits that can be correctly read as containing 3 0s are treated as cache lines usable at ultra low operating voltages. In this scenario a d-bit failure is extremely unlikely since all three bits must fail for a d-bit failure to occur.

Figure 3A:
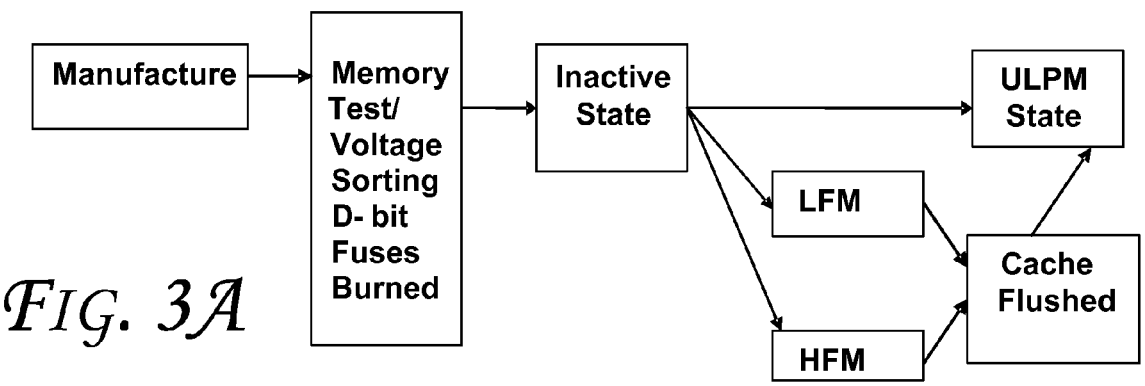
FIGS. 3A and 3B illustrate voltage sorting state diagrams for disable bit testing, in accordance with some embodiments.
Figure 3B:
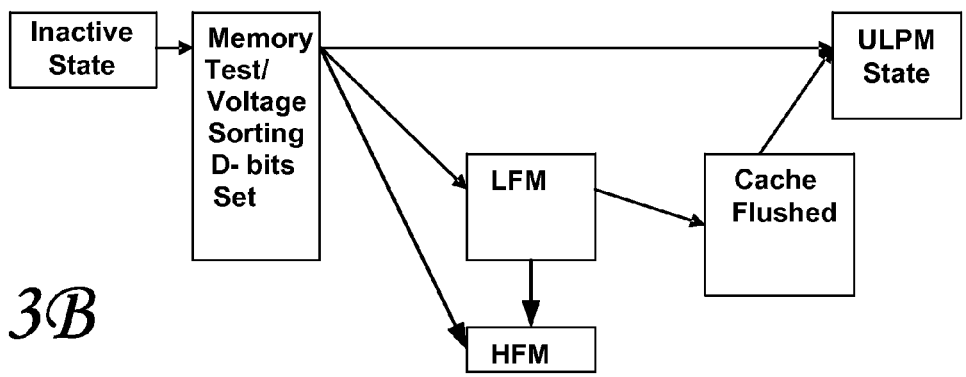

FIGS. 3A and 3B illustrate voltage sorting state diagrams for d-bit testing during manufacture and POST (Power On Self Test), respectively, in accordance with some embodiments. More particularly, voltage sorting may occur in one of two ways. First, voltage sorting may be performed when the processor is manufactured as shown in FIG. 3A. Since the d-bits are to remain valid even after a power cycle has occurred, the d-bits are stored in fuses or some other type of non-volatile memory such as BIOS (Basic Input Output System) memory or on-package flash. An alternative would be to store the d-bits in an additional bit that is included in the tag or state bits (e.g., Modified Exclusive Shared Invalid (MESI) bits) associated with a cache line. Storing the d-bits in this way requires that each power down is followed by a new voltage sorting to regenerate the d-bits. This approach also requires that a processor has the ability to perform a memory test on its memory structures in the field at low voltages. One way to achieve this would be to make use of POST (to set the appropriate d-bits) as shown in FIG. 3B. More specifically, FIG. 3B shows how a processor with four different states, HFM (High Frequency Mode), LFM (Low Frequency Mode), ULPM, off, might transition between the states when the d-bits are set by POST and are to be regenerated after each power cycle. Moreover, POST follows every transition from off state to one of the three on states.

As discussed with reference to FIGS. 2A through 3B, a cache is to be configurable with different capacities for different levels of performance and different Vccmin for different power budgets. Also, some embodiments may allow for designing of parts that address markets with different power requirements. This will save costs by allowing for design of fewer products that address a broader range of markets.

In an embodiment, fault-free bits of faulty cache entries are used instead of discarding the full entries. Moreover, in order to enable low Vccmin operation in caches, a moderate faulty bit rate incurred by the lower Vcc is tolerated. This approach may be extended to provide high performance predictability, which ensures that two processors provide the same performance for any given program. The performance variability is based on the different chip samples potentially having different faulty locations, and thus having different impact on performance.

Figure 4B:
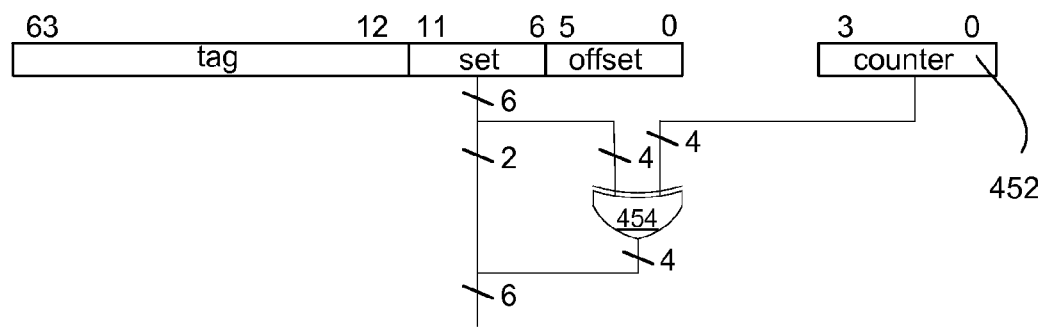
FIG. 4B illustrates a block diagram of address remapping logic, according to an embodiment.
Figure 4A:
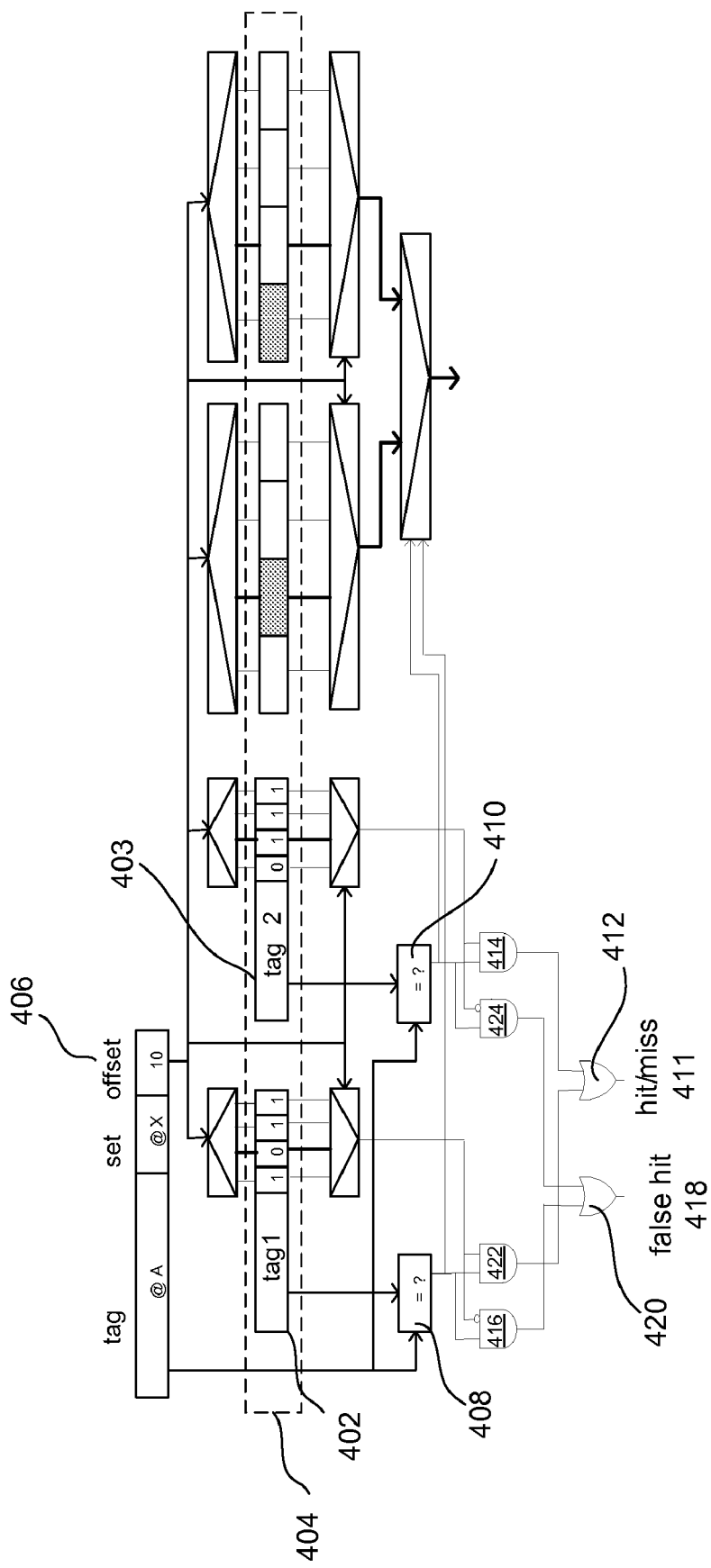
FIG. 4A illustrates a schematic of a read operation in a cache, according to an embodiment.

FIG. 4A illustrates a schematic of a read operation in a cache, according to an embodiment. The cache shown is two-way set-associative, and each cache line has four subblocks. In an embodiment, each cache line is extended with few bits that may be stored together with the cache tag (e.g., bits 1011 stored with tag 1 or bits 0111 stored with tag 2 in FIG. 4A). Each cache line is split logically into subblocks. The size of such subblocks may match the smallest part of a line with its own parity or ECC (Error Correction Code) protection. For instance, a DL0 cache whose contents are ECC protected at 64-bit granularity and whose cache lines have 8 of those subblocks will use 8 extra bits to indicate whether each subblock may be used or not. All extra bits are set except those whose corresponding subblock has more faulty bits than allowed. For instance, a SECDED (Single Error Correction, Double Error Detection) protected block with two faulty bits should have its corresponding bit reset.

The cache of FIG. 4A operates as follows. Whenever an access is performed, the tags 402 and 403 are read and data from all lines in the set 404 are retrieved if required. Note that address offset indicates which subblocks are required. The offset 406 is used to pick the bit corresponding to the subblock required for each cache line in the set. Cache tags are compared (e.g., by comparators 408 and 410) against the address requested. In some situations, there may be a tag hit 411 (output through OR gate 412 based on outputs of AND gates 414 and 422), but the extra bit corresponding to such subblock may indicate that it is faulty. In such case we have a false hit 418 (e.g., output through the OR gate 420 based on outputs of AND gates 416 and 424). This situation may be addressed as follows:

(i) A miss is reported because the datum is not present.

(ii) The cache line is evicted and dirty data is updated in upper cache levels for write-back caches. Note that only valid subblocks may need to be updated. Write-through caches get the cache line evicted for loads and update upper cache levels for stores.

(iii) The cache line is marked as the most recently used (MRU) line in the set in such a way that whenever the data is requested from the upper cache level, it is allocated into a different cache line, which is very likely to have a fault-free block to hold the data required. In the unlikely case that the cache line chosen has a faulty subblock in the same location, the process is repeated so that if there is at least one cache line in the set with a fault-free subblock in the required position, it will be found. Only unacceptably high faulty bit rates (e.g., based on a threshold value for a given design) would cause all subblocks in the same location within the cache lines in a given set to fail.

Accordingly, accesses to cache may hit in the tag but treated as misses because extra bit(s) identifying that part of the cache line are defective in an embodiment. Note that there may be a way to disable any cache line such as discussed above by using a d-bit. Such mechanisms may be used to prevent using cache lines with faulty tags, faulty valid bits, or faulty dirty bits. In an embodiment, if the extra bits are faulty, the cache line is also marked as faulty. Further, the extra mechanisms shown in FIG. 4A (such as the extra bits, and comparison logics and associated AND and OR gates may be bypassed during high Vcc operation, e.g., by setting all the extra bits to "1" or simply ignoring those bits.

FIG. 4B illustrates a block diagram of address remapping logic, according to an embodiment. To address performance variability, dynamic address remapping may be used (e.g., in a round-robin fashion), so that a given address is mapped to different cache sets in different time intervals. This way, given a program and a faulty bit rate, performance hardly changes from one processor to another, no matter where the faulty bits are located.

As shown in FIG. 4B, an N bit counter 452 may be used, where N may be any value between 1 and the number of bits required to identify cache sets. For instance, in the 32 KB 8-way cache with 64 bytes/line there are 64 sets, which may be indexed with 6 bits. Thus, a counter with 6 bits or fewer is enough. In the particular implementation shown, a 4-bit counter 452 is used. Such counter is updated periodically or from time to time (e.g., every 10 million cycles). The N bits of the counter are bitwise XORed by XOR gate 454 with N bits of the bits indexing the set. Accordingly, a given address may map to different cache sets at different times in an embodiment.

Furthermore, address remapping may be performed either at cache access time or at address calculation time. Latency impact should be low since a single XOR gate level is added and half of the inputs are set in advance (those coming from the counter). In an embodiment, cache contents are flushed whenever the counter is updated to prevent inconsistencies. However, the counter may be updated seldom, and thus, the performance impact is negligible. Moreover, the mechanism of FIG. 4B may be deactivated for high Vcc operation by simply preventing the counter from updating.

Figure 5:
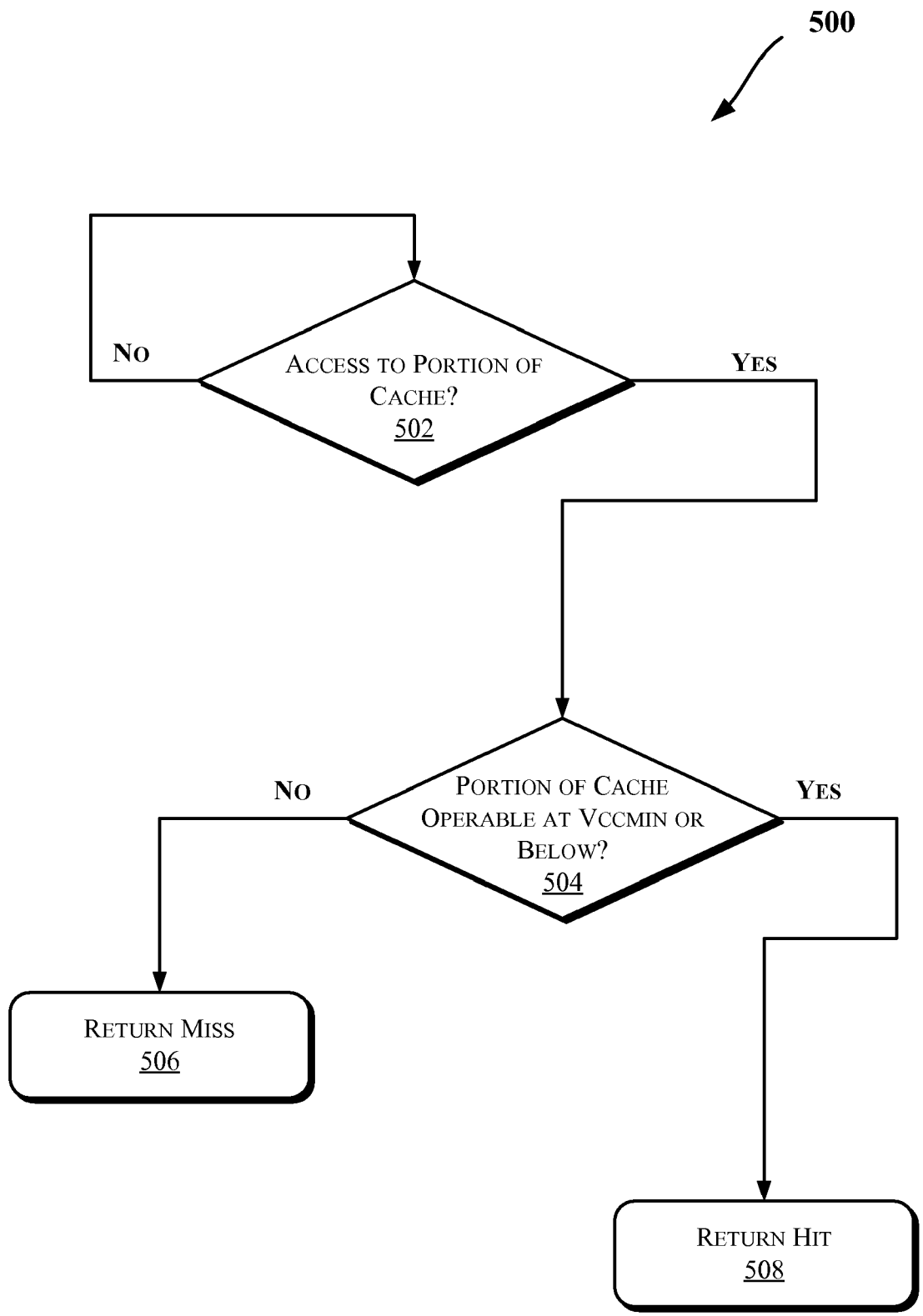
FIG. 5 illustrates a flow diagram of a method in accordance with an embodiment of the invention.

FIG. 5 illustrates a flow diagram of a method 500 to disable a portion of a cache during low voltage operations, according to an embodiment of the invention. In some embodiments, various components discussed with reference to FIGS. 1-4 and 6-7 may be utilized to perform one or more of the operations discussed with reference to FIG. 5.

Referring to FIGS. 1-5, at an operation 502, it is determined whether an access request to a portion of a cache is received or detected (e.g., by the logic 202 or logic shown in FIG. 4A). If access is received, then operation 504 determines whether the cache portion is operable at Vccmin or below such as discussed herein, e.g., with reference to FIGS. 1-4B. If the determination of operation 504 is negative, a miss is returned (such as discussed with reference to FIGS. 1-4B). If determination of operation 504 is positive, then operation 508 returns a hit (such as discussed with reference to FIGS. 1-4B).

Figure 6:
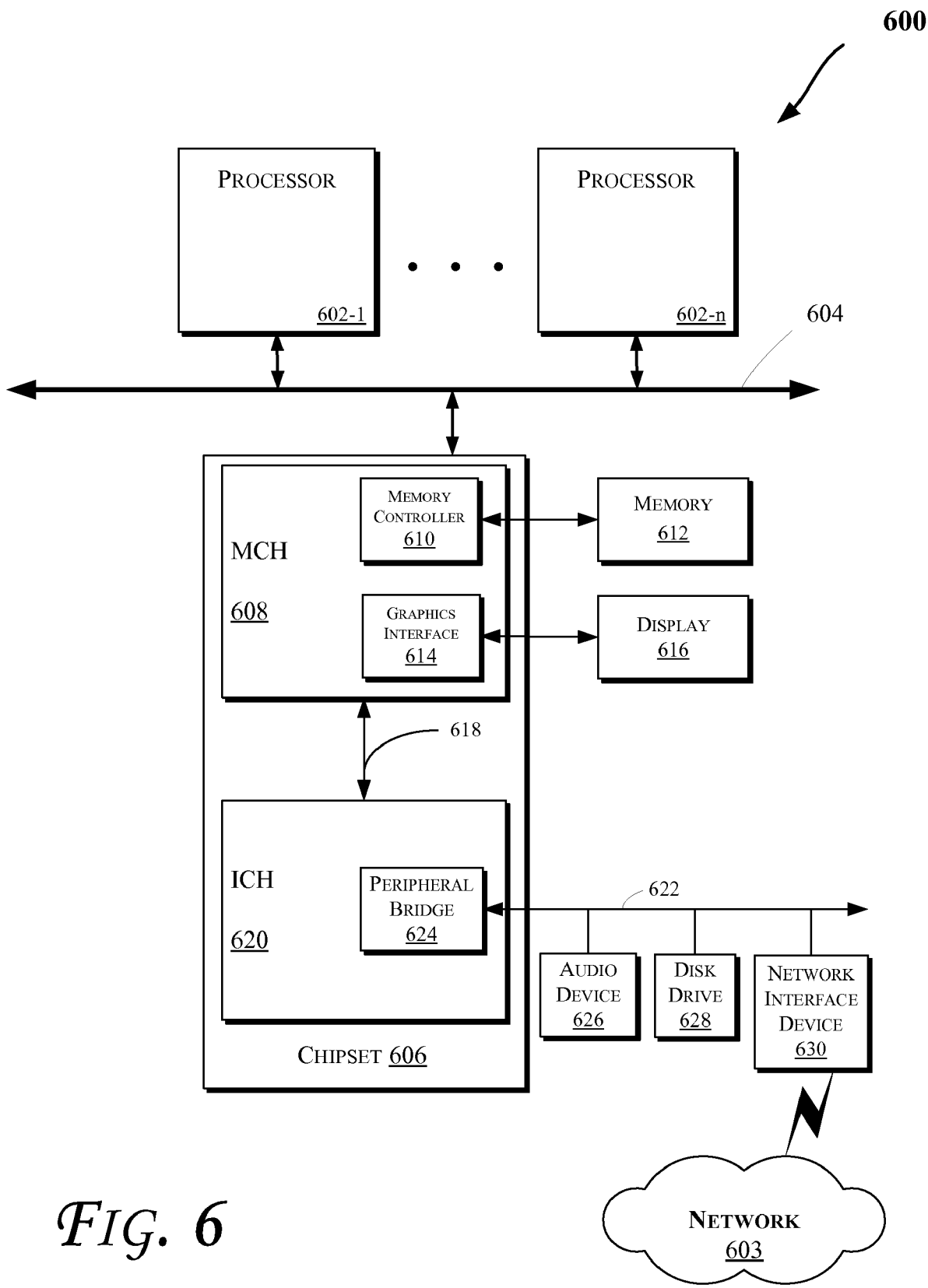

FIG. 6 illustrates a block diagram of a computing system 600 in accordance with an embodiment of the invention. The computing system 600 may include one or more central processing unit(s) (CPUs) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an embodiment, one or more of the processors 602 may be the same or similar to the processors 102 of FIG. 1. For example, one or more of the processors 602 may include one or more of the caches discussed with reference to FIGS. 1-5. Also, the operations discussed with reference to FIGS. 1-5 may be performed by one or more components of the system 600.

A chipset 606 may also communicate with the interconnection network 604. The chipset 606 may include a memory control hub (MCH) 608. The MCH 608 may include a memory controller 610 that communicates with a memory 612 (which may be the same or similar to the memory 114 of FIG. 1). The memory 612 may store data, including sequences of instructions, that may be executed by the CPU 602, or any other device included in the computing system 600. In one embodiment of the invention, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple CPUs and/or multiple system memories.

The MCH 608 may also include a graphics interface 614 that communicates with a display device 616. In one embodiment of the invention, the graphics interface 614 may communicate with the display device 616 via an accelerated graphics port (AGP). In an embodiment of the invention, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the CPU 602 and peripheral devices. Other types of topologies may be utilized. Also, multiple buses may communicate with the ICH 620, e.g., through multiple bridges or controllers. Moreover, other peripherals in communication with the ICH 620 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some embodiments of the invention. In addition, the processor 602 and other components shown in FIG. 6 (including but not limited to the MCH 608, one or more components of the MCH 608, etc.) may be combined to form a single chip. Furthermore, a graphics accelerator may be included within the MCH 608 in other embodiments of the invention.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
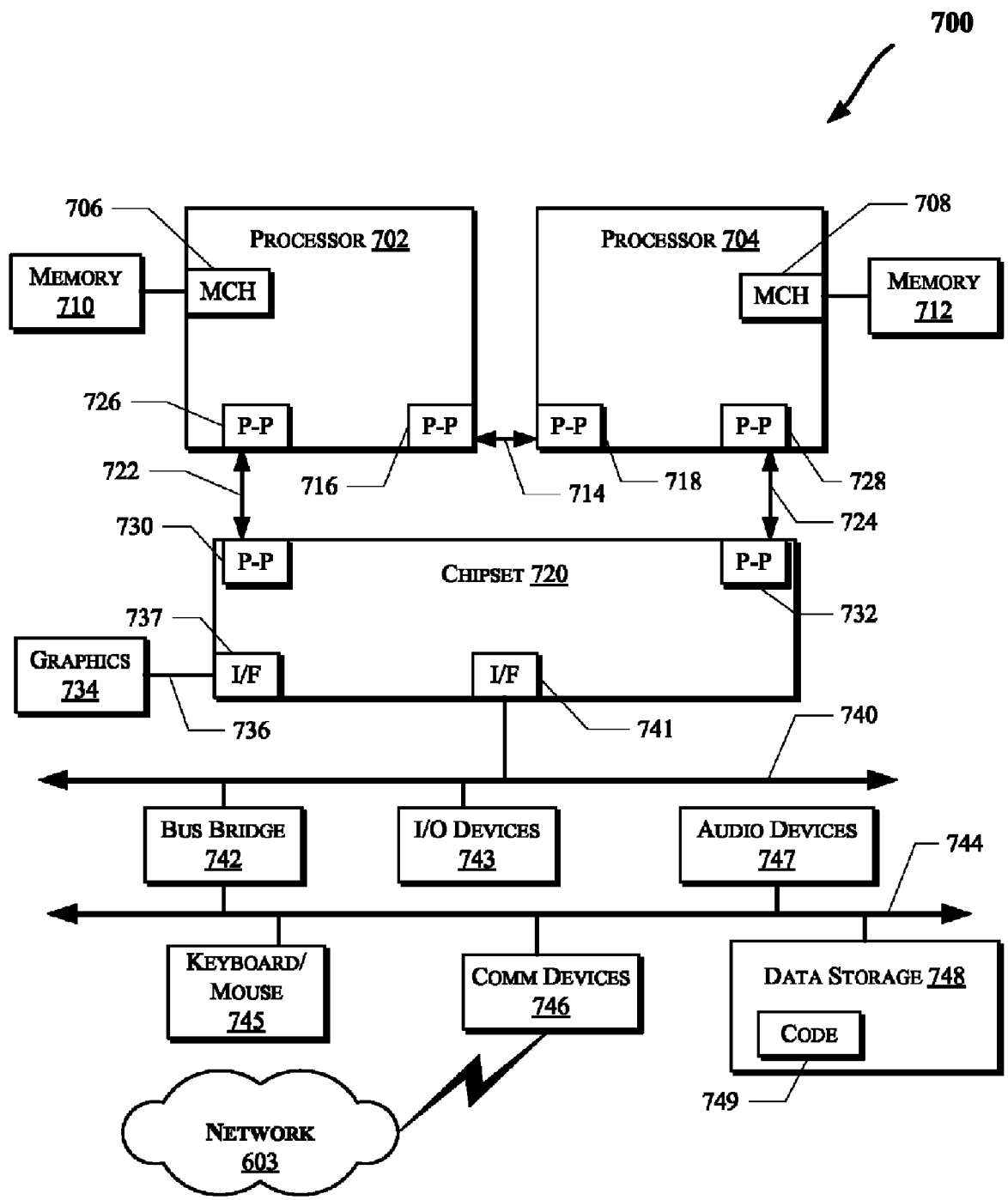

FIG. 7 illustrates a computing system 700 that is arranged in a point-to-point (PtP) configuration, according to an embodiment of the invention. In particular, FIG. 7 shows a system where processors, memory, and input/output devices are interconnected by a number of point-to-point interfaces. The operations discussed with reference to FIGS. 1-6 may be performed by one or more components of the system 700.

As illustrated in FIG. 7, the system 700 may include several processors, of which only two, processors 702 and 704 are shown for clarity. The processors 702 and 704 may each include a local memory controller hub (MCH) 706 and 708 to enable communication with memories 710 and 712. The memories 710 and/or 712 may store various data such as those discussed with reference to the memory 612 of FIG. 6.

In an embodiment, the processors 702 and 704 may be one of the processors 602 discussed with reference to FIG. 6, e.g., including one or more of the caches discussed with reference to FIGS. 1-6. The processors 702 and 704 may exchange data via a point-to-point (PtP) interface 714 using PtP interface circuits 716 and 718, respectively. Also, the processors 702 and 704 may each exchange data with a chipset 720 via individual PtP interfaces 722 and 724 using point-to-point interface circuits 726, 728, 730, and 732. The chipset 720 may further exchange data with a graphics circuit 734 via a graphics interface 736, e.g., using a PtP interface circuit 737.

At least one embodiment of the invention may be provided within the processors 702 and 704. For example, one or more of the cores 106 of FIG. 1 may be located within the processors 702 and 704. Other embodiments of the invention, however, may exist in other circuits, logic units, or devices within the system 700 of FIG. 7. Furthermore, other embodiments of the invention may be distributed throughout several circuits, logic units, or devices illustrated in FIG. 7.

The chipset 720 may communicate with a bus 740 using a PtP interface circuit 741. The bus 740 may communicate with one or more devices, such as a bus bridge 742 and I/O devices 743. Via a bus 744, the bus bridge 742 may communicate with other devices such as a keyboard/mouse 745, communication devices 746 (such as modems, network interface devices, or other communication devices that may communicate with the computer network 603), audio I/O device 747, and/or a data storage device 748. The data storage device 748 may store code 749 that may be executed by the processors 702 and/or 704.

In various embodiments of the invention, the operations discussed herein, e.g., with reference to FIGS. 1-7, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include a storage device such as those discussed herein.

Additionally, such tangible computer-readable media may be downloaded as a computer program product, wherein the program may be transferred from a remote computer (e.g., a server) to a requesting computer (e.g., a client) by way of data signals in a propagation medium via a communication link (e.g., a bus, a modem, or a network connection).

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
a cache;
logic to detect access to a portion of the cache and determine whether the portion of the cache is operable at an ultra low voltage level based on one or more bits corresponding to the portion of the cache,
wherein the ultra low voltage level is at or lower than a minimum voltage level and the minimum voltage level corresponds to a voltage level at which all memory cells of the cache may operate reliably.

2. The apparatus of claim 1, wherein the portion of the cache comprises one or more: cache lines or subblocks of cache lines.

3. The apparatus of claim 1, further comprising logic to test the portion of cache to determine whether the portion of the cache is operable at the ultra low voltage level, wherein the logic to test performs the test during manufacturing or Power On Self Test (POST).

4. The apparatus of claim 3, further comprising logic to update the one or more bits in response to test results generated by the logic to test.

5. The apparatus of claim 1, wherein the one or more bits comprise one or more redundant bits.

6. The apparatus of claim 1, wherein the access to the portion of the cache results in a miss in response to the one or more bits even if there is a hit in a corresponding tag.

7. The apparatus of claim 1, wherein a given address of the portion of the cache maps to different cache sets at different times.

8. The apparatus of claim 7, further comprising counter to result in the given address being mapped to different cache sets.

9. The apparatus of claim 1, wherein the cache comprises a level 1 cache, a mid-level cache, or a last level cache.

10. The apparatus of claim 1, further comprising one or more processor cores, wherein at least one of the one or more processor cores is to comprise the cache.

11. A method comprising:
receiving a request to access a portion of a cache;
determining whether the cache is to operate at an ultra low voltage level which is at or lower than a minimum voltage level, wherein the minimum voltage level corresponds to a voltage at which all memory cells of the cache may operate reliably;
determining whether the portion of the cache is operable at the ultra low voltage level based on one or more bits corresponding to the portion of the cache.

12. The method of claim 11, further comprising testing the portion of cache to determine whether the portion of the cache is operable at the ultra low voltage level, wherein the testing is to be performed during manufacturing or Power On Self Test (POST).

13. The method of claim 12 further comprising updating the one or more bits in response to the testing.

14. The method of claim 11 wherein the portion of the cache comprises one or more: cache lines or subblocks of cache lines.

15. The method of claim 11, further comprising:
receiving a request to enter a power mode corresponding to the ultra low voltage level; and
flushing the portion of the cache in response to a determination that the portion of the cache is incapable of operating at the ultra low voltage level.

16. A computing system comprising:
a memory to store an instruction; and
a processor core to execute the instruction, the processor core to comprise logic to detect access to a portion of a cache and determine whether the portion of the cache is operable at an ultra low voltage level based on one or more bits corresponding to the portion of the cache, wherein the ultra low voltage level is at or lower than a minimum voltage level and the minimum voltage level corresponds to a voltage level at which all memory cells of the cache may operate reliably.

17. The system of claim 16, wherein the portion of the cache comprises one or more: cache lines or subblocks of cache lines.

18. The system of claim 16, further comprising logic to test the portion of cache to determine whether the portion of the cache is operable at the ultra low voltage level, wherein the logic to test performs the test during manufacturing or Power On Self Test (POST).

19. The system of claim 16, wherein the cache comprises a level 1 cache, a mid-level cache, or a last level cache.

20. The system of claim 16, further comprising an audio device coupled to the processor core.

* * * * *